April 21, 1953  W. T. DUNN  2,635,477
POWER TRANSMISSION
Filed Aug. 9, 1949  4 Sheets-Sheet 1
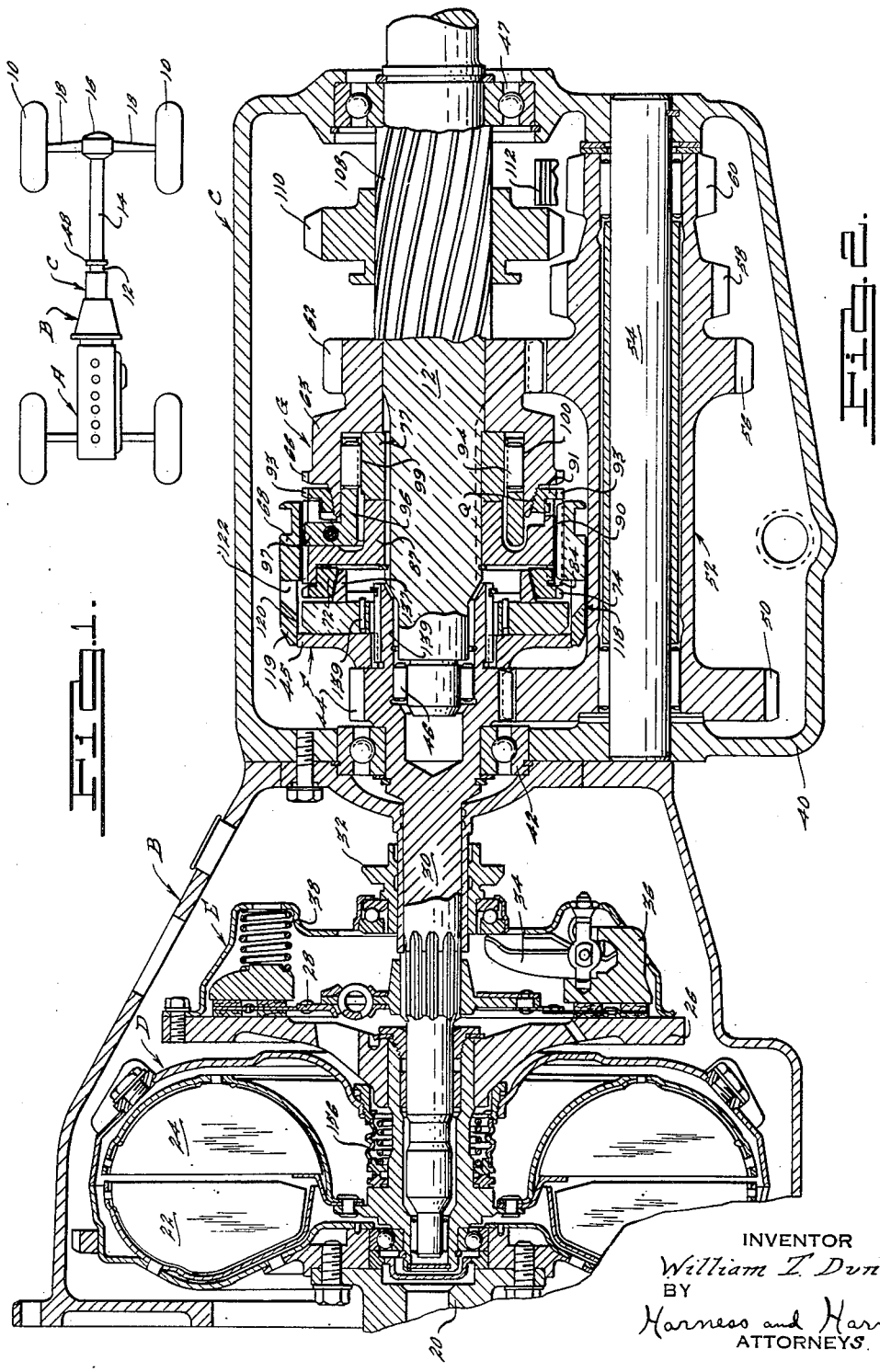
INVENTOR
William T. Dunn.
BY
Harness and Harris
ATTORNEYS.

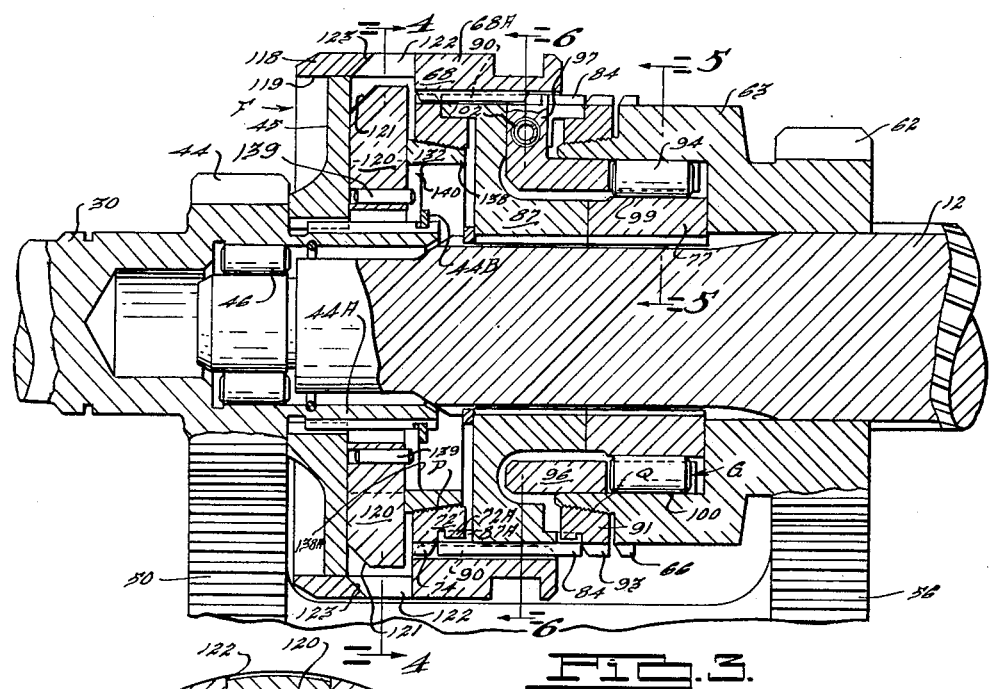
April 21, 1953  W. T. DUNN  2,635,477
POWER TRANSMISSION
Filed Aug. 9, 1949  4 Sheets-Sheet 2
INVENTOR
William T. Dunn
BY
Harness and Harris
ATTORNEYS April 21, 1953 W. T. DUNN 2,635,477
POWER TRANSMISSION
Filed Aug. 9, 1949 4 Sheets-Sheet 3
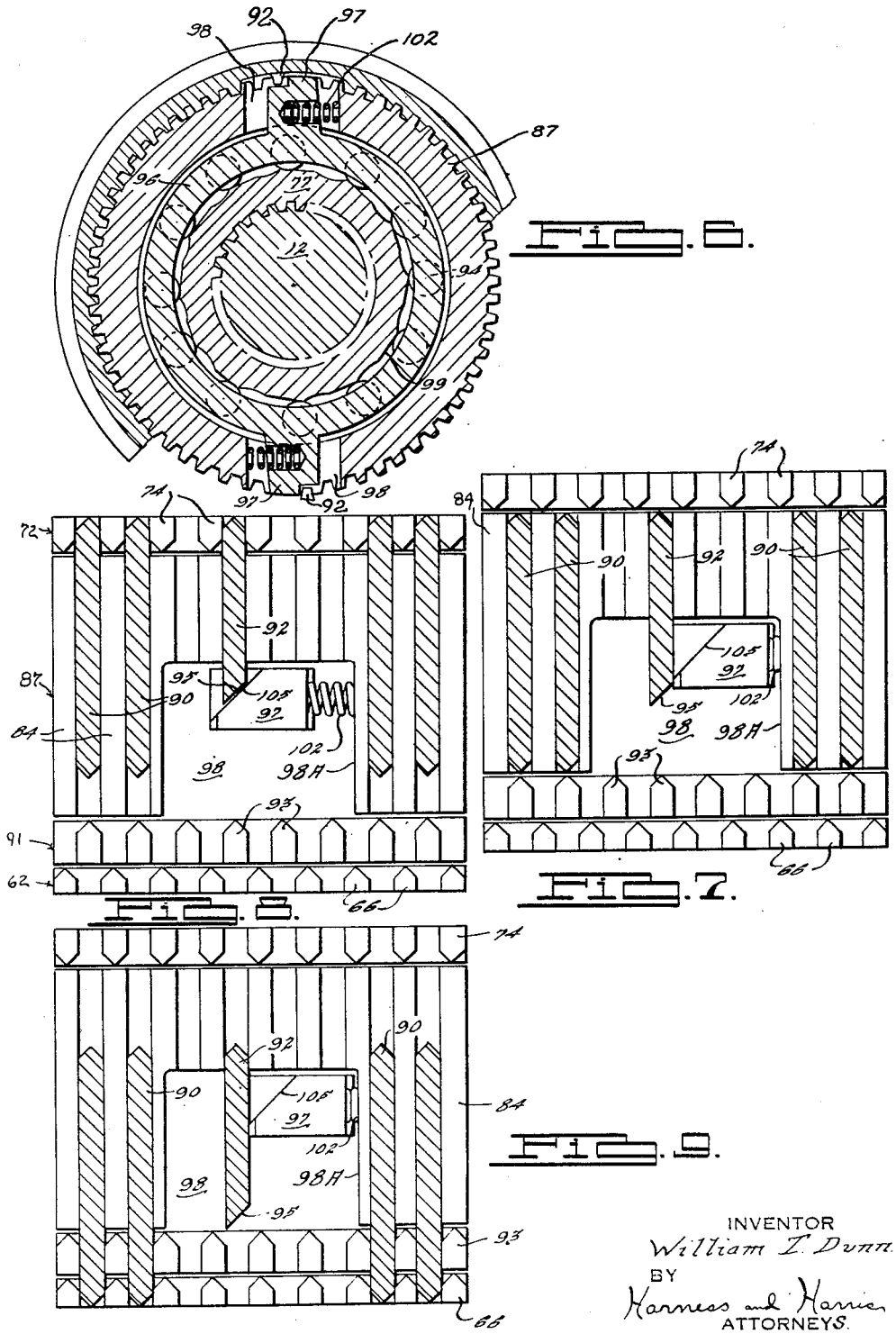
INVENTOR
William T. Dunn
BY
Harness and Harris
ATTORNEYS.

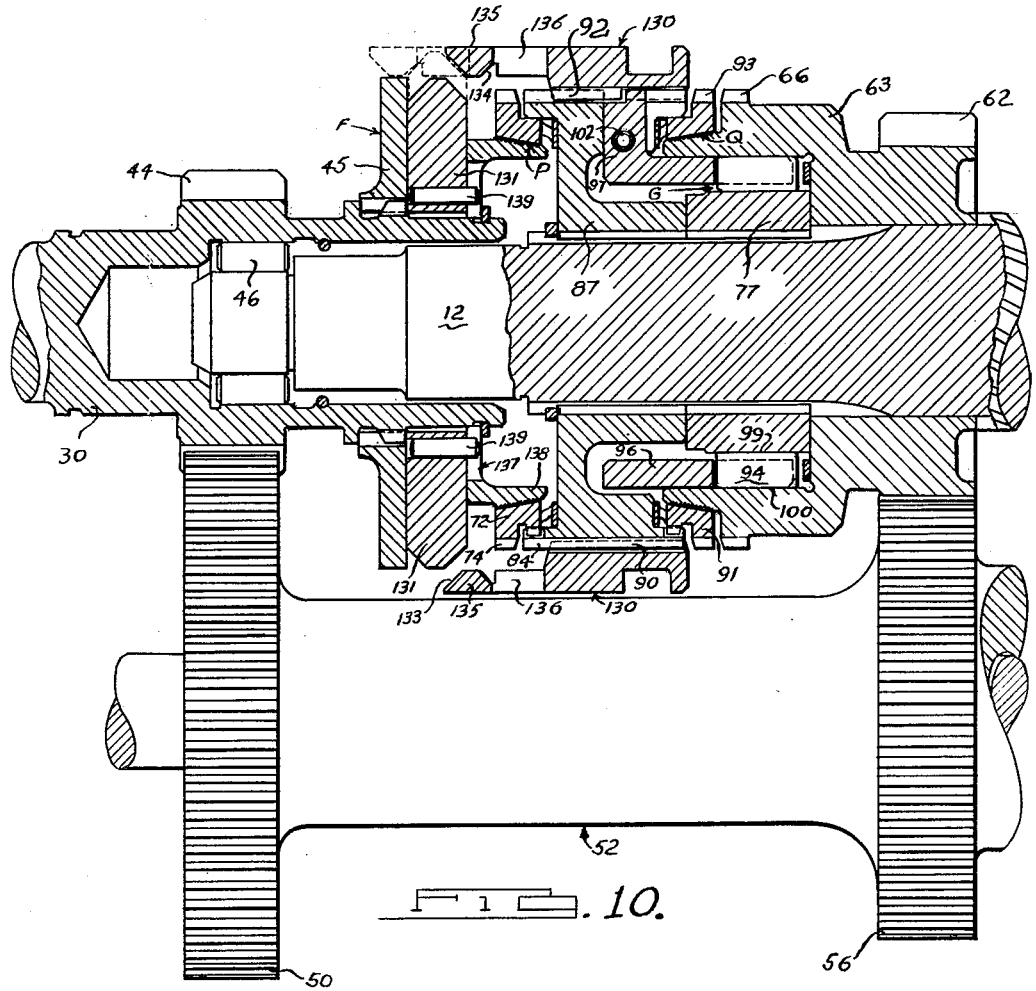

Patented Apr. 21, 1953

2,635,477

UNITED STATES PATENT OFFICE 2,635,477

POWER TRANSMISSION

William T. Dunn, Detroit, Mich., assignor to Chrysler Corporation, Highland Park, Mich., a corporation of Delaware Application August 9, 1949, Serial No. 109,282

29 Claims. (Cl. 74—336)

This invention relates to power transmission, and particularly to improvements in semi-automatic transmissions of the manually selective type which transmissions provide, for instance, three forward speeds and a reverse speed.

One of the disadvantages of transmissions of the aforesaid type is the requirement for de-clutching and making several selective gear changes in order to get into the cruising speed ratio drive from a starting gear ratio drive. To overcome this disadvantage, automatic shifting has been provided in some automatic type transmissions but such has been limited to the higher price lines due to transmissions of this type requiring expensive mechanical and electrical controls in order to accomplish the automatic changes in speed ratio drive. The present invention contemplates a simplified, low cost, mechanical arrangement, free of complicated controls, for the accomplishment of automatic speed ratio changes, such an arrangement being particularly adaptable for relatively low-priced automobiles. In its broad aspect the invention incorporates in a manually selective transmission a centrifugal force controlled clutch in combination with an overrunning clutch, these elements being arranged so that automatic changes in speed ratio drive between a starting gear ratio and a cruising direct drive ratio may be readily accomplished. When my novel construction is used in combination with a fluid coupling, it is possible, under ordinary conditions of forward drive, to merely shift from a neutral position to a starting gear ratio and thereafter de-clutching is unnecessary as the upshifts and downshifts, to accomplish the required changes in speed ratio drive, take place automatically.

An object of the present invention is to provide an improved, inexpensive transmission incorporating a driver controlled, automatic, mechanical upshift between a starting second or intermediate speed and cruising direct drive or high speed.

Another object of this invention is to provide an improved, overrunning clutch construction for transmissions in which automatic changes in speed ratio between a reduced speed starting gear ratio and a cruising direct drive ratio are readily accomplished.

Another object of this invention is to provide a shift sleeve for an automatic type transmission which sleeve includes means to positively disengage the centrifugal clutch as well as means to neutralize the overrunning clutch.

Another object of this invention is to provide a shift sleeve for an automatic type transmission which sleeve constitutes the driven member of the centrifugal clutch, the means for positively disengaging the centrifugal clutch and the control means for the overrunning clutch.

Another object of this invention is to provide an automatic type transmission with manual means, as well as centrifugal means, for effecting a kickdown or downshift from direct drive to an intermediate speed drive.

Another object of this invention is to provide a centrifugal clutch construction for an automatic type transmission in which the shift sleeve is so constructed and arranged that ratcheting between the driving and driven members of the clutch is prevented.

Another object is to provide a simple, inexpensive three forward speeds and reverse speed transmission for low price cars which transmission has at least one automatic speed change.

A further object is to provide a transmission of the aforesaid type having a two-way drive in each speed ratio and in addition an overrunning starting drive in intermediate speed ratio adapted to be automatically upshifted into the direct drive ratio under driver control and automatically downshifted from the cruising, direct drive ratio to the intermediate speed ratio.

An additional object is to provide an improved, simplified transmission having a starting, one-way, intermediate or second speed drive, adapted to be automatically shifted into high speed direct drive, and also a starting, two-way, intermediate or second speed drive operable for coasting against the engine.

A further object of this invention is to provide an improved, inexpensive, transmission in which the shift from a one-way drive in second speed to a two-way drive in second speed is accomplished by moving the shift sleeve into engagement with only a single set of gear teeth.

These and other objects and advantages of my invention will become apparent from the following description when taken in conjunction with the accompanying drawings wherein:

Fig. 1 is a diagrammatic showing of the power plant and drive mechanism of a vehicle incorporating the present invention;

Fig. 2 is a sectional elevational view through the fluid coupling, friction clutch and speed ratio changing transmission of a vehicle embodying my invention, the gearing being shown in neutral position with the pawls of the centrifugal clutch disengaged;

Fig. 3 is a sectional elevational view of a portion of the transmission shown in Fig. 2, the shift sleeve being shown in its forward position for the transmission of an overrunning, intermediate speed drive;

Fig. 4 is a sectional view taken along line 4—4 of Fig. 3 showing the pawls of the centrifugal pawl mechanism engaged with the shift sleeve for the transmission of direct drive;

Fig. 5 is a sectional view taken along line 5—5 of Fig. 3 showing a portion of the overrunning clutch mechanism;

Fig. 6 is a sectional view taken along the line 6—6 of Fig. 3 showing the overrunning clutch roller cage control structure;

Fig. 7 is a sectional plan development view illustrating the shift sleeve in neutral position and having certain teeth in such relationship to the control structure of the overrunning clutch roller cage as to neutralize the clutch;

Fig. 8 is a sectional plan view similar to Fig. 7 but showing the shift sleeve in its forward position for the transmission of direct drive or one-way intermediate speed drive, the overrunning clutch roller cage control structure being here shown in such relationship to the sleeve teeth as to permit drive engagement of the roller clutch;

Fig. 9 is a sectional plan view similar to Figs. 7 and 8 but showing the shift sleeve in its rearward position neutralizing the one-way roller clutch and providing for the transmission of a two-way intermediate speed drive; and Fig. 10 is a sectional elevational view of a portion of a transmission embodying a modification of my invention, the gearing being shown in neutral position.

Referring now to the drawings wherein similar reference characters are used to designate corresponding parts in the several views, Fig. 1 illustrates a typical diagrammatic arrangement of a vehicle embodying the transmission mechanism constituting the present invention. The vehicle engine A is connected to the driving wheels 10 of the vehicle through a fluid power transmitting and clutch unit B and a change speed gearing C, shown in detail in Figs. 2–9 inclusive, and comprising a three speeds forward and reverse transmission having an automatically operative direct drive ratio. As seen in Fig. 1, the output or driven shaft 12 of the unit C is connected by means of the usual propeller shaft 14 to the customary differential gear box 16 which in turn drives the axle shafts 18 on which are mounted the driving wheels 10.

As best seen in Fig. 2, I preferably arrange for transmitting drive from the crankshaft 20 of engine A to the transmission C through clutch means B comprising a fluid power transmitting device, for example, a fluid coupling D of the kinetic type operating in conjunction with a releasable friction clutch E of conventional design, the latter clutch being primarily employed to facilitate manual shifts in the transmission C. Due to the use of a fluid coupling it is possible to start from any selected gear ratio and accordingly, for ordinary forward driving, starting in either of the hereinafter described intermediate or second speed gears is most advantageous for materially reducing declutching and manual shifting.

The engine crankshaft 20 drives the coupling impeller 22 and the rotation of the impeller 22 causes fluid to circulate in the vaned passages of the fluid coupling D so as to drive the vaned runner 24 in the customary manner of operation for fluid couplings of the type illustrated. The runner 24 drives the clutch member 26 of the friction clutch E. Driven clutch member 28 is fixed to intermediate shaft 30 and is drivingly disengaged from driving member 26 by depressing a clutch pedal (not shown) which slides throw-out sleeve 32 forwardly to operate levers 34 so as to unload driving pressure plate 36. Springs 38 load this plate 36 and cause engagement of the clutch E when the clutch pedal is released.

Shaft 30 extends rearwardly into the housing or casing 40 of transmission C where it is rotatably supported by a ball bearing 42. The rearwardly extending end of shaft 30 is formed with a main drive pinion 44. Also drivingly carried on the rearward portion of the shaft 30 is an annular slotted core member 45 constituting the pawl carrier of a centrifugal clutch F, more clearly illustrated in Fig. 4 and subsequently described in detail. The drive pinion 44 is hollow and journals, by a needle bearing 46 (see Fig. 2), the forward end of the transmission driven shaft 12, the rear end of shaft 12 being journaled in bearing 47. Shaft 12 may also carry at its rear end a propeller shaft brake drum 48 (see Fig. 1) having braking mechanism (not shown) associated therewith.

The drive pinion 44 continuously meshes with a gear 50 for driving the countershaft gear cluster 52. The gear cluster 52 is rotatably mounted on a countershaft 54 which is supported at its end portions by the casing 40. The gear cluster 52 includes a second or intermediate speed pinion 56, a first or low speed pinion 58 and a reverse pinion 60.

The intermediate or second speed pinion 56 constantly meshes with an intermediate or second speed gear 62 which is journaled for rotation on the shaft 12. The second speed gear 62 is substantially cup-shaped and has a forwardly extending flange portion 63 provided with teeth 66. Flange portion 63 is formed to provide a frusto-conically shaped surface Q adapted to receive a blocker ring 91 having teeth 93. Flange portion 63 is also formed with a smooth inner wall portion 100 so as to provide a smooth outer race or runway for the rollers 94 of a clutch G of the conventional overrunning type.

Within the flange portion 63 of gear 62 a sleeve member 77 is keyed to the shaft 12. Sleeve 77 has cam faces 99 (see Fig. 5) formed thereon to provide the inner race for the rollers 94 of the overrunning clutch G. Overrunning clutch G provides a one-way driving connection between the intermediate speed gear 62 and the shaft 12, clutch G being adapted to drivingly lock the gear 62 and the shaft 12 together upon tendency of the gear 62 to rotate faster than the shaft 12, in a forward direction, while permitting overrun of the shaft 12 relative to the gear 62 when the shaft rotates faster than the gear 62 in a forward direction. The clutch G is further provided with a cage or carrier 96 having axially extending fingers 96A circumferentially spacing the rollers 94, and with opposite radially directed control fingers or tabs 97 receivable in slots 98 in the hub 87 also keyed to the shaft 12 forwardly of the sleeve 77. Compression springs 102, seated in recesses of the tabs 97 bear against side 98A of slots 98 in hub 87 so as to bias the rollers 94 in the direction of the arrow 104, see Fig. 5, into a locked-up driving position between the inner race cam faces 99 of the shaft 12, sleeve 77 and the outer race 100 on the flange portion 63 of gear 62. Lock-up of the overrunning clutch G, for the transmission of a one-way, intermediate speed drive, can occur only when the shift sleeve 68 is shifted to its forward position, as will be hereinafter explained, due to a camming arrangement between the chamfered portion 95 of teeth 92 on the sleeve 68 and chamfered portion 105 on the ends of the tabs 97 of the overrunning clutch roller cage 96.

Hub 87 has external splines or teeth 84 adapted to interengage with the internal teeth 90 of the shift sleeve 68 which is slidably mounted on the hub 87 for forward and rearward axial movement relative thereto.

The centrifugal clutch F, which is preferably of the pawl type, is located as seen in Figure 4 adjacent the forward end of the driven shaft 12 between the hub 87 and the rear end of the drive pinion 44. The clutch F comprises the pawl carrier 45, splined on the rearward end portion 44A of drive pinion 44, a pawl 120 and a pawl receiving shell portion 118 integral with the shift sleeve 68. The pawl carrier 45 is provided with pawl guides 114, 115 having arcuate faces 116 fitting within the overhanging clutch shell portion 118. Two pawls are shown and these are slidably secured to the carrier guides 114, 115 and are adapted for limited outward radial movement oppositely to one another to engage pawl receiving slots 122 provided in the overhanging portion 118 of the shift sleeve 68. Engagement of a pawl 120 with a slot 122 establishes a two-way direct drive between the driving pinion 44 and the driven shaft 12. Six pawl receiving slots are provided in the overhanging portion 118 of the shift sleeve member 68, the slots being 60 degrees apart. Each of the pawls 120 has a pair of side faces in sliding engagement with the side faces of the pawl guide members 114, 115 as clearly shown in Fig. 4. The pawls are normally biased inwardly of the pawl cage formed by the guide members 114, 115, of the core member 45 to their retracted or disengaged position relative to the shell slots 122 by control or governor compression springs 131, until a predetermined speed of rotation of the pawl carrier 45 has been attained at which time the centrifugal force acting on the pawls is sufficient to overcome the bias of the springs and urge the pawls outwardly to engage the slots. The springs 131 are seated in recesses 132 in the guide portions 115, and also extend into recesses 133 in the lateral wings 135 of the pawls 120. Adjustment of the engaging speed of the pawls 120 may be made either by replacing the springs 131 with springs of different force values or by means of conventional adjustment bolts (not shown) which may be provided on the guides 115 so as to vary the tension of the springs. The slots 122 in the pawl shell portion 118 are arranged so that diametrically opposite slots will simultaneously register with the pawls 120 so as to receive the pawls under the conditions hereinafter described.

Shift sleeve 68 (see Figs. 7-9 incl.) is provided with axially extending internal teeth 90. The opposite ends of the teeth 90 are pointed and the teeth extend substantially the full length of the body portion 68A of the sleeve except in the sections of the sleeve having the cut-out portions 98 to receive the outwardly extending lug ends of the overrunning clutch cage tabs 97. In each of these sections of the shift sleeve all internal teeth 90 are omitted except a single tooth 92 of reduced length. The rearward end of each tooth 92 is chamfered or angled as at 95 to provide face means to cammingly engage the angled side or face 105 of the clutch roller-cage tab lugs 97, when sleeve 68 is shifted rearwardly to either its neutral or two-way drive intermediate speed position, so as to rotate the roller cage 96 in a direction opposite to the direction of the arrow 104 (Fig. 5) and thus neutralize the overrunning clutch G by moving the rollers 94 out of locked-up driving engagement with cams 99 and race 100. The length of the cam teeth 92 is such that when sleeve 68 is in its forward position the tab lugs 97 are not engaged by the teeth 92 and consequently rollers 94 are not cammed out of driving engagement between the races 99 and 100. Hence clutch G is then operative to transmit a one-way intermediate speed drive from gear 62 to shaft 12, said drive being capable of being automatically upshifted to direct drive by pawl engagement.

The sleeve 68 is provided with an improved type of pawl receiving slot 122 adapted to cooperate with the pawls 120 of centrifugal clutch F, to provide means for the transmission of direct drive from the drive pinion 44 to the driven shaft 12. The front side walls 123, of the pawl receiving slots 122, slope inwardly and forwardly in order to provide a cam surface to engage the chamfered outer end surface 121 of the pawls 120, when sleeve 68 is in its forward position and the pawls 120 are engaged in the pawl slots 122. To positively disengage pawls 120 from the pawl shell slots 122 the shift sleeve 68 is shifted rearwardly to its neutral or two-way drive intermediate speed position and the cam faces 123 of the sleeve 68 will move the pawls 120 radially inwardly so as to disengage the centrifugal clutch F. It will be noted that when shift sleeve 68 is shifted rearwardly to disconnect the direct drive mechanism of clutch F then the unperforated part 119 of the overhanging shell portion 118 of sleeve 68 blocks the outward movement of pawls 120 and renders the clutch F inoperative.

A feature of the invention is a combination pawl balk ring and shift sleeve blocker ring element 137 which is journaled for rotation on the portion 44A of the drive pinion 44 and is held in position axially between the pawl carrier 45 and a suitable snap ring 45B. The element 137 comprises an axially extending annular portion 138 and a flange portion 138A at the forward end of the portion 138. The portion 138 is formed with an external, frusto-conically shaped supporting surface P on which is mounted for frictional drive therewith a conventional synchronizing and blocker ring element 72 having blocker teeth 74. By means of a well known lug 72A and slot 87A construction such as more fully shown in the patent to Fishburn No. 2,333,165, the ring 72 is arranged to have a limited relative rotation with the hub 87 such that the teeth 74 will resist engagement of the sleeve teeth with teeth 74 when the relative speeds of the pawl carrier and sleeve are asynchronous but will permit these teeth to engage when the speeds of these members are synchronous. Blocker teeth 74 are adapted to be engaged with the sleeve teeth 90 on forward shift of sleeve 68.

The transverse annular flange portion 138A is designed to limit engagement of the pawls 120 with the pawl receiving slots 122 to permit automatic upshift from a one-way intermediate speed drive to a two-way direct drive to conditions where the relative rotative speeds of the pawls and shell are synchronous. To effect this result the pawls 120 are provided with lateral projections or pins 139 operable in slots 140 of the balk ring portion 138A having their outer ends positioned in the plane of the slots 140. When pawls 120 are retracted and the relative rotative speeds of the pawls and members 137 are asynchronous, the pins 139 engage the shoulders 141 or 142, formed by stepped portions at the opposite circumferential ends of the slots 140. Under engine drive conditions the pins 139 are moved to the drive block position so as to engage the shoulders 141 of the balk ring slots 140 and under engine coasting the pins 139 are moved off the shoulders 141 and into the open portions of the slots 140 which permits the pawls 120 to move outwardly to engage the slots 122 if they then are at or above their engaging speed. The pawls 120 engage the slots 122 when the speeds of the carrier 45 and the sleeve 68 cross each other, that is, become synchronized. Should the speed of the pawl carrier 45 be below that of the sleeve 68 and the pawls be below their engaging speed the pawl pins 139 will engage the shoulders 142 of the slots 140. The same will take place if the pawls fail to engage under the aforesaid coast conditions. The pawls will then have moved from the drive block to the coast block position and a change in the relative directions of rotation of the carrier and shell will be necessary to effect pawl engagement.

As previously stated, the pawls 120 cannot move outwardly to engage the slots 122 until after the pawl carrier 45 reaches a speed of rotation sufficient to overcome the resistance of the springs 131. The balk ring element 137 prevents pawl engagement and ratcheting between the pawls 120 and the slots 122 during asynchronous rotation of the carrier, and slotted shift sleeve and permits alignment of the pawls 120 with the pawl slots 122, when the speeds of the carrier 45 and slotted sleeve 68 become synchronized. When the pawls move outwardly into the slots 122, their movement is limited by engagement of the portions 138 of the pawl shoulders 135 with the inner surfaces 146 of the guide portions 115 of the pawl carrier 45.

The blocker teeth 74 are pointed on their rear ends, as are the forward ends of sleeve teeth 90, engageable with the blocker teeth 74, to facilitate blocking and forward shifting of shift sleeve 68. Blocker teeth 93 and gear teeth 66 are pointed on their forward ends, as are the rear ends of sleeve teeth 90, to facilitate rearward shift of the sleeve 68. Preferably the teeth 74, 93, 66, and 90 are equally angled at each side. The teeth 90 of sleeve 68 are preferably of the same form and pitch as the blocker teeth 74 and 93 and the hub teeth 66 and are axially in line therewith when the sleeve and blocker teeth are interengaged.

If desired, the internal frusto-conically shaped surfaces of the blocker rings 72 and 91 may be threaded to improve the frictional engagement between these abutting elements. Suitable clocking lugs 72A similar to those on the blocker ring 72 are provided on the blocker ring 91 to cooperate with clocking slots 87A on the hub 87 to cause the blocker ring 91 to perform its intended functions.

The shift sleeve 68 is adapted to be shifted forwardly from the neutral position shown in Figs. 2 and 7 to the intermediate or second speed, one-way drive position shown in Figs. 3 and 8 wherein the sleeve teeth 90 are engaged with the blocker ring teeth 74 to thereby establish the freewheel intermediate or second speed drive ratio between the input shaft 30 and the driven shaft 12 through the means consisting of elements 30, 44, 50, 56, 62, G, 77, and 12. In this forward position teeth 92 on sleeve 68 have moved relative to the lug 97 of the roller cage 96 to permit rotation of the latter to its position enabling establishment of a one-way overrunning drive through the overrunning clutch G. Moreover, the slots 122 in the sleeve 68 are positioned above the pawls 120 to permit upshift, at a predetermined speed, to direct drive by pawl engagement.

The sleeve 68 is also adapted to be shifted rearwardly of the neutral position, shown in Figs. 2 and 7 to the position shown in Fig. 9 so as to engage the sleeve teeth 90 with the blocker teeth 93 and the teeth 66 on the flange of gear 62 to thereby establish a two-way intermediate or second speed drive through the means consisting of elements 30, 44, 50, 56, 62, 66, 90, 84, 87, and 12. When the shift sleeve 68 is moved to establish two-way second speed from one-way second the sleeve teeth 92 cammingly engage the lugs 97 of the overrunning clutch roller cage 96 so as to rotate the cage rollers 94 out of engagement with the clutch outer race 100 to thus neutralize the clutch G and prevent drive of the shaft 12 by the gear 62 through the freewheel clutch G.

In the neutral position of the sleeve 68, seen in Figs. 2 and 7, the sleeve teeth 90 are disengaged from both the blocker teeth 74 and the second speed gear teeth 66 and the clutch G is neutralized by the action of sleeve teeth 92 on lugs 97.

In shifting from neutral to either of the second speed starting gear ratios it is merely necessary to move the shift sleeve 68 either forwardly or rearwardly to engage the teeth 90 with either the teeth 74 or the teeth 66 respectively. If the sleeve 68 is engaged in either the automatic one-way second speed or the two-way drive second speed, it is a simple matter to shift to the other second speed gear for it merely requires disengagement of the teeth 90 and either the teeth 66 or 74 and engagement of the teeth 90 with the other set of teeth. In other words, it is merely necessary to engage the sleeve teeth 90 with one set of teeth.

The sleeve 68 is adapted to be shifted into the various positions by a shift yoke and rail mechanism (not shown) under control of the driver, suitable stops or detents being provided to properly locate the sleeve.

Rearwardly of the gear 62 the shaft 12 is provided with a spiral splined portion 108 on which is slidably mounted a combination low or first speed and reverse gear 110, this member being shown in its neutral position in Fig. 2. This gear 110 may be shifted forwardly or rearwardly of its neutral position by suitable yoke and rail mechanism (not shown) under driver control. When shifted forwardly the gear 110 becomes engaged with the low speed or first speed pinion 58 to establish the low or first speed drive ratio between the shafts 30 and 12, the drive transmission being through elements 30, 44, 50, 58, 110, 108, and 12. When shifted rearwardly the gear 110 becomes engaged with an idler gear 112 that is constantly in mesh with the reverse pinion gear 60, thus establishing reverse drive between the shafts 30 and 12. It will be understood that when shifting the gear 110 the shift sleeve 68 is in neutral position.

Operation

In describing the operation of this transmission let it be assumed that the shift sleeve 68 and the combination low-reverse gear 110 are both in neutral positions, the clutch E engaged and the engine idling at approximately 450 R. P. M. Under these conditions the impeller 22 of the fluid coupling D will rotate at engine speed. There will be very little slip in the fluid coupling at this time due to the drag of the coupling seal 156 between the impeller 22 and runner 24 and the light load imposed on the coupling by the clutch G, pawl carrier 45 and countershaft parts. Hence, the pawl carrier 45 will rotate at a speed slightly under engine speed which is not sufficiently high to cause centrifugal force to move the clutch pawls 120 outwardly into the slots 122 of the pawl shell 118. Moreover, there will be no drive between the gear 62 and shaft 12 since the teeth 66 of the gear 62 are disconnected from the teeth 90 of the shift sleeve 68 and portion 119 of sleeve 68 renders clutch F inoperative. Furthermore, the teeth 92 of sleeve 68 hold the lugs 97 of the overrunning clutch roller cage 96 in position to neutralize the clutch G and prevent drive from the gear 62 through the freewheel clutch G and sleeve 77 to the shaft 12.

In order to obtain forward movement of the car, the driver releases the clutch E so as to permit manual shift into one of the two second speed starting gear ratios or into low gear.

If the driver desires to start in the automatically upshifting, intermediate or second speed gear ratio he shifts the clutch sleeve 68 forwardly during which movement the sleeve teeth 90 become engaged with the teeth 74 of blocker ring 72, the pawl slots 122 are moved into radial alignment with the pawls 120 and the sleeve teeth 92 are moved out relative to the overrunning clutch cage lugs 97 so as to activate the clutch G for the transmission of the one-way intermediate speed drive. Upon completion of this forward shifting movement of the sleeve 68 the driver will then engage the clutch E and depress the fuel accelerator to speed up the engine and the car will be driven forwardly in the one-way second speed ratio drive referred to above, through the gear train comprising shaft 30, pinion 44, gear 50, pinion 56, gear 62, overrunning device G, sleeve 77 and shaft 12. This is the starting drive ratio that permits an automatic upshift to direct drive, under driver control. The car will be accelerated in this one-way second speed ratio, with the various elements being speeded up as the engine speed is increased and the car gains momentum, until the fluid coupling D is operating in substantially 1:1 ratio. This condition occurs around 550 R. P. M. of the engine. Manifestly, the pawl carrier 45 will rotate at a speed corresponding to that of the coupling runner 24 and at some predetermined speed of these elements, for example, 625 R. P. M. substantially corresponding to a car speed of about 16 to 17 M. P. H., the centrifugal force of the pawls 120 will overcome the resistance of the springs 131 and tend to move the pawls radially outward but their movement is restrained by the balk ring element 137. The balk ring element 137 through engagement of the shoulders 141 with the pins 139 will not permit the pawls 120 to move outwardly to engage the slots 122 of the sleeve 68 under these conditions for the pawl carrier 45 is at this time rotating faster than the slotted shell portion 118 of the sleeve 68. This condition will continue so long as the runner 24 imposes torque on the shaft 30 that exceeds the load on the driven shaft 12. When the driver wishes direct drive speed ratio to be established he merely releases the accelerator to decelerate the engine and relieve the driving torque through the transmission, whereupon, the runner 24 and pawl carrier 45 will slow down and when the rotative speeds of the pawl carrier 45 and the shift sleeve 68 cross each other, that is, become synchronized, the balk ring element 137 will permit the pins 139 to leave the shoulders 141 to facilitate alignment of the pawls 120 with the slots 122 so that the pawls 120 can move outwardly to engage the slots 122. It is to be noted that the slots 140 are of sufficient length between the shoulders 141, 142 to assure alignment of the pawls with the slots 122 within approximately the angular distance, 60 degrees in the present case, between adjacent pawl receiving slots 122. Upon subsequent depression of the accelerator to again speed up the engine, the transmission of torque will again be resumed and direct drive will have been established. Direct drive is transmitted through the train comprising the shaft 30, pawl carrier 45, pawls 120, slots 122, sleeve 68, teeth 90 and 84, hub 87 and shaft 12. This is a two-way drive. It will be understood that in making engagement with the slots 122, the pawls 120 will be cushioned by the fluid coupling D which will absorb any shock occurring in the engagement and will also reduce to a minimum, vibration and noise.

The pawl clutch F will remain engaged and the vehicle be driven in direct drive until the speed of the pawl carrier 45 falls below a predetermined R. P. M. for instance, approximately 575 R. P. M. corresponding to a vehicle speed of about 14 to 15 M. P. H. in direct drive, whereupon the springs 131 will effect a release of the pawls 120 from the slots 122 and hence a release of the direct drive. Upon release of the pawls 120, direct drive through the sleeve 68 ceases and the overrunning clutch unit G will simultaneously and automatically re-establish the one-way second speed drive through the transmission. It is to be noted that at the engine speed at which the pawls release, or begin releasing, a substantial no-slip condition prevails in the fluid coupling drive and hence very little drag torque is imposed upon the pawls 120 to prevent their disengagement. Moreover, the springs 131 are generally strong enough to overcome the coast torque impressed upon the pawls at slow vehicle speeds. In view of this automatic operation it is possible, for example, for the driver to slow down the vehicle in approaching a traffic signal and to obtain an automatic downshift from direct drive to freewheel second drive ratio in the process, all without releasing the clutch E. At the traffic signal, the driver may allow the transmission to remain in one-way second speed drive ratio, without any creep of the vehicle occurring, inasmuch as at this time the engine idle speed is preferably insufficient to develop the torque required to overcome the drag load of the vehicle on the runner of the fluid coupling D. The foot brake may, of course, be lightly applied if necessary to assure this result. When the traffic signal changes, the driver need merely depress the accelerator pedal to accelerate the engine and the vehicle will again move forward in one-way second speed ratio drive after which an automatic upshift, under driver control, may be accomplished when the necessary vehicle speed has been attained.

It is sometimes desirable, for instance, when coasting down a hill in direct drive or freewheel second, to obtain engine braking. This may be obtained by the driver releasing the clutch E and shifting the clutch sleeve 68 rearwardly to simultaneously disengage pawls 120 from slots 122 and engage the sleeve teeth 90 with the teeth 66 of the hub of gear 62 to establish a two-way second speed ratio drive comprising the shaft 30, pinion 44, gear 50, pinion 56, gear 62, teeth 66 and 90, sleeve 68, hub 87, and shaft 12. In making this downshift, regardless of the speed of carrier 45 the pawls 120 are positively disengaged from slots 122 by the cam action between the pawl slot walls 123 and the chamfered ends 121 of the pawls 120. At the same time the release of clutch E relieves the driving torque between the pawls and the shell slots and the springs 131 assist in the retraction of the pawls. Release of clutch E also reduces the speed of rotation of the pawl carrier 45 so that the centrifugal force urging the pawls outwardly against the force exerted by the springs 131 is greatly reduced. Upon retraction of the pawls 120 the vehicle is then in freewheel second speed drive and upon further rearward movement of shift sleeve 68 to engage teeth 90 with teeth 66 the two-way, second speed drive is established to enable engine braking.

Shift from two-way second speed drive to the freewheel second speed drive is obtained by releasing the accelerator pedal to decelerate the engine and obtain a reversal of driving torque on the engaged teeth 66, 90 whereupon a forward shift of the sleeve 68 will disengage these teeth and simultaneously engage the sleeve teeth 90 with the blocker teeth 74 and radially align the slots 122 with the pawls 120. Concurrently with engagement of teeth 74 and 90, the clutch G is activated and establishes the freewheel second speed drive from the gear 62 through the freewheel clutch G to the sleeve 77 and shaft 12.

It will be noted that blocker ring 72 not only aids in synchronizing the speeds of rotation of the hub 87, sleeve 68 and pawl carrier 45 before completion of the forward shift of sleeve 68 but ring 72 also serves as a buffer element to prevent sudden shift of sleeve 68 from a neutral position to the forward freewheel intermediate speed position without first disengaging the main clutch E. By preventing sudden shifts of the sleeve 68 from the neutral to the forward freewheel position the blocker element 72 protects the transmission from sudden stresses and tooth breakage.

If high torque multiplication is desired, for starting under adverse conditions the shift sleeve 68 is left in neutral position and the low speed gear 100 is shifted forwardly to engage the low speed pinion 58. Thereafter upon depression of the accelecator the vehicle will be driven through the shaft 30, pinion 44, gear 50, pinion 58, gear 110, and shaft 12 in the low or first speed ratio.

Reverse drive is made available by shifting the combination low speed and reverse gear 110 rearwardly to engage the idler gear 112 to thereby establish reverse drive through the shaft 30, pinion 44, gear 50, pinion 60, idler gear 112, gear 110, and shaft 12.

It will be understood that adequate means are provided for locking the shift sleeve 68 in neutral when making any shift of the gear 110 and conversely the gear 110 is locked in a neutral position when shift is made of the sleeve 68.

Referring to Fig. 10 there is shown a modified form of my invention in which a different type of centrifugal clutch construction is presented from that disclosed in Figs. 1 through 9. In this modification the shift sleeve 130 keyed to the hub 87 is provided with a slotted, forwardly extending, shell portion 135 adapted to overhang the pawls 131 carried by the pawl carrier 45. The pawls 131 have the outer end portions of both their front and rear walls chamfered so as to provide pointed end pawls adapted to cooperate with the angled camming surfaces 133 and 134 adjacent the forward edge of the overhanging portion 135 of shift sleeve 130. By the construction herein disclosed it will be noted that the pawls 131 are cammed inwardly when the shift sleeve 130 is shifted either forwardly or rearwardly in the event the speed of the pawl carrier 45 is such as to have positioned the pawls 131 radially outwardly beyond the peripheral edge of the pawl carrier 45. This construction not only provides a means for positively disengaging the pawls 131 from the slots 136 when it is desired to disconnect the direct drive ratio but it also provides a positive means for camming the pawls inwardly, prior to shifting into the one-way drive intermediate speed position, if the speed of the pawl carrier 45 has been such as to urge the pawls outwardly so as to interfere with the forward shift of the sleeve 130. Broken lines in Fig. 10 indicate positions of pawls 131 and sleeve 130 when engaged for the transmission of direct drive. Except for the modified pawl and pawl shell construction hereinabove described this transmission construction is identical to that disclosed in Figs. 1 to 9, inclusive.

From the above description it will be seen that I have provided a novel transmission construction having an automatic speed upshift and downshift free of complicated electrical or mechanical controlling devices, which construction provides a low cost, simplified, improved transmission particularly adapted for relatively low-priced automobiles. Due to the use of a single shift sleeve member to positively control the disengagement of the pawls of the centrifugal clutch as well as the neutralization of the overrunning clutch I have eliminated unnecessary parts and improved the operating characteristics of the transmission. It will be understood that although the particular arrangement disclosed herein is well adapted for carrying out the objects of my invention, various modifications, changes and substitutions may be made without departing from the spirit and scope of the invention as set forth in the appended claims.

I claim:

1. In a variable speed power transmission, a driving shaft, a driven shaft, a centrifugal clutch between said shafts adapted to connect said shafts after said driving shaft has attained a predetermined speed of rotation, reduction gears driven by said driving shaft including a reduced speed driving pinion, a gear journalled on said driven shaft, said gear being in constant mesh with said pinion and having means adapted to be engaged with a shift sleeve, an overrunning clutch mounted on said driven shaft and adapted to drivingly connect said gear with said driven shaft, a shift sleeve mounted on said driven shaft for axial shift relative thereto, said sleeve including means adapted to be engaged with said gear, means constituting the driven member of said centrifugal clutch, means to positively disengage said centrifugal clutch, and means engageable with said overrunning clutch to neutralize said overrunning clutch.

2. In a variable speed power transmission, a driving shaft, a driven shaft, a first centrifugal clutch member mounted on said driving shaft, a second centrifugal clutch member mounted on said driven shaft and adapted to be automatically engaged with said first centrifugal clutch member to connect said shafts after said driving shaft has attained a predetermined speed of rotation, reduction gears driven by said driving shaft including a reduced speed driving pinion, a gear jornalled on said driven shaft, said gear being in constant mesh with said pinion and having means adapted to be engaged with a shift sleeve, an overrunning clutch mounted on said driven shaft and adapted to directly drivingly connect said gear with said driven shaft, neutralizing means carried by said overrunning clutch, a shift sleeve mounted on said driven shaft for axial shift relative thereto, said sleeve carrying said second centrifugal clutch member and including means engageable with said neutralizing means for neutralizing operation of said overrunning clutch, means adapted to be engaged with said gear, and means to positively disengage said centrifugal clutch.

3. In a variable speed power transmission, a driving shaft, a driven shaft, a first centrifugal clutch member mounted on said driving shaft, a second centrifugal clutch member mounted on said driven shaft and adapted to be automatically engaged with said first centrifugal clutch member to connect said shafts after said driving shaft has attained a predetermined speed of rotation, reduction gears driven by said driving shaft including a reduced speed driving pinion, a gear journalled on said driven shaft, said gear being in constant mesh with said pinion and having means adapted to be engaged with a shift sleeve, an overrunning clutch mounted on said driven shaft and adapted to directly drivingly connect said gear with said driven shaft, said overrunning clutch including a roller cage, a shift sleeve mounted on said driven shaft for axial shift relative thereto, said sleeve carrying said second centrifugal clutch member and including means to control operation of said overrunning clutch roller cage, and means adapted to be engaged with said gear.

4. In a variable speed power transmission, a driving shaft, a driven shaft, a centrifugal clutch between said shafts adapted to automatically connect said shafts after said driving shaft has attained a predetermined speed of rotation, reduction gears driven by said driving shaft including a reduced speed driving pinion, a gear journalled on said driven shaft, said gear being in constant mesh with said pinion and having means adapted to be engaged with a shift sleeve, an overrunning clutch adapted to directly drivingly connect said gear to said driven shaft, a shift sleeve mounted on said driven shaft for axial shift relative thereto, said sleeve including means adapted to selectively engage said gear and to activate said overrunning clutch so as to respectively provide for a two-way and a one-way intermediate speed drive, said one-way intermediate speed drive being capable of automatic upshift to direct drive, said sleeve including means to positively disengage said centrifugal clutch, and means to positively neutralize said overrunning clutch.

5. In a variable speed power transmission, a driving shaft, a driven shaft, a centrifugal clutch between said shafts adapted to automatically connect said shafts after said driving shaft has attained a predetermined speed of rotation, reduction gears driven by said driving shaft including a reduced speed driving pinion, a gear journalled on said driven shaft, said gear being in constant mesh with said pinion and having means adapted to be engaged with a shift sleeve, an overrunning clutch adapted to directly drivingly connect said gear to said driven shaft, said overrunning clutch including means operable to actuate this clutch between a neutral and drive condition, a shift sleeve mounted on said driven shaft for axial shift relative thereto, said sleeve including means adapted to selectively engage said gear and means engageable with said overrunning clutch actuating means so as to respectively provide for a two-way and a one-way intermediate speed drive, said one-way intermediate speed drive being capable of automatic upshift to direct drive, said sleeve including means to positively disengage said centrifugal clutch.

6. In a variable speed power transmission, a drive pinion, a centrifugal clutch member, including a radially movable pawl, carried by said drive pinion, countershaft gears driven by said drive pinion including an intermediate speed pinion, a driven shaft, an intermediate speed gear journalled on said driven shaft, said intermediate speed gear being in constant mesh with said intermediate speed pinion and having means adapted to be engaged with a shift sleeve, an overrunning clutch adapted to directly drivingly connect said intermediate speed gear to said driven shaft, said overrunning clutch including a roller cage, and a shift sleeve carried by said driven shaft and shiftable axially thereof, said sleeve having means adapted to be engaged with said intermediate speed gear and with said cage when said sleeve is shifted to one axial position so as to establish a two-way intermediate speed drive, said sleeve including a pawl receiving slot adapted to be engaged with the pawl of said centrifugal clutch member, after said sleeve is shifted to a second axial position, shift of said sleeve from said first axial position to said second axial position disengaging said two-way intermediate speed drive and establishing a one-way intermediate speed drive through said overrunning clutch which drive is capable of being automatically upshifted, after said drive pinion attains a predetermined speed of rotation, to a two-way direct drive between said drive pinion and said driven shaft and automatically downshifted from direct drive to one-way intermediate speed drive when the rotative speed of said drive pinion is reduced below said predetermined speed.

7. In a variable speed power transmission, a driving shaft, a driven shaft, a first centrifugal clutch member, including a radially movable pawl, carried by said driving shaft, reduction gears driven by said driving shaft including a reduced speed driving pinion, a gear journalled on said driven shaft, said gear being in constant mesh with said pinion and having means adapted to be engaged with a shift sleeve, an overrunning clutch adapted to directly drivingly connect said gear to said driven shaft, a shift sleeve mounted on said driven shaft for axial shift relative thereto, said sleeve including means adapted to be engaged with said gear, means, including a pawl receiving slot, constituting a second centrifugal clutch member and being adapted to be automatically engaged with said first centrifugal clutch member after said driving shaft attains a predetermined speed of rotation, cam means to control said overrunning clutch, and said sleeve including means to positively disengage said centrifugal clutch members.

8. In a variable speed power transmission, a driving shaft, a driven shaft, a first centrifugal clutch member, including a radially movable pawl, carried by said driving shaft, reduction gears driven by said driving shaft including a reduced speed driving pinion, a gear journalled on said driven shaft, said gear being in constant mesh with said pinion and having means adapted to be engaged with a shift sleeve, an overrunning clutch adapted to directly drivingly connect said gear to said driven shaft, a shift sleeve mounted on said driven shaft for axial shift relative thereto, said sleeve including means adapted to be engaged with said gear, cam means to control operation of said overrunning clutch, and a pawl receiving slot, constituting a second centrifugal clutch member, adapted to be automatically engaged with the pawl of said first centrifugal clutch member after said driving shaft attains a predetermined speed of rotation, said slot having a wall portion adapted to cam said pawl radially inwardly during axial shift of said sleeve so as to effect positive disengagement of said centrifugal clutch members.

9. In a variable speed power transmission, a driving shaft, a driven shaft, a first centrifugal clutch member, including a radially movable pawl, carried by said driving shaft, reduction gears driven by said driving shaft including a reduced speed driving pinion, a gear journalled on said driven shaft, said gear being in constant mesh with said pinion and having means adapted to be engaged with a shift sleeve, an overrunning clutch adapted to directly drivingly connect said gear to said driven shaft, a shift sleeve mounted on said driven shaft for axial shift relative thereto, said sleeve including means adapted to be engaged with said gear, cam means to control operation of said overrunning clutch, and a pawl receiving slot, constituting a second centrifugal clutch member, adapted to be automatically engaged with the pawl of said first centrifugal clutch member after said driving shaft attains a predetermined speed of rotation, said slotted sleeve having wall portions adapted to cam said pawl radially inwardly during axial shift of said sleeve.

10. In a variable speed power transmission, a driving shaft, a first centrifugal clutch member carried by said driving shaft, reduction gears driven by said driving shaft including a reduced speed driving pinion, a driven shaft, a gear journalled on said driven shaft, said gear being in constant mesh with said pinion and having means adapted to be engaged with a shift sleeve, an overrunning clutch shell carried by said gear, an overrunning clutch positioned between and drivingly connecting said shell and said driven shaft, a shift sleeve mounted on said driven shaft for axial shift relative thereto, said sleeve including means adapted to be engaged with said gear when said sleeve is shifted to one axial position so as to establish a two-way reduced speed drive, said sleeve including additional means, constituting a second centrifugal clutch member, adapted to be automatically engaged with said first centrifugal clutch member after said sleeve is shifted to a second axial position, shift of said sleeve from said first axial position to said second axial position disengaging said two-way reduced speed drive and establishing a one-way reduced speed drive which is capable of being automatically upshifted to a two-way direct drive after said driving shaft has attained a predetermined speed of rotation, said sleeve including additional means adapted to cooperate with said overrunning clutch to neutralize said clutch when said sleeve is located in a neutral position and the two-way, reduced speed drive position.

11. In a variable speed power transmission, a driving shaft, a first centrifugal clutch member carried by said driving shaft, reduction gears driven by said driving shaft including a reduced speed driving pinion, a driven shaft, a gear journalled on said driven shaft, said gear being in constant mesh with said pinion and having means adapted to be engaged with a shift sleeve, an overrunning clutch shell carried by said gear, an overrunning clutch positioned between and drivingly connecting said shell and said driven shaft, a shift sleeve mounted on said driven shaft for axial shift relative thereto, said sleeve including means adapted to be engaged with said gear when said sleeve is shifted to one axial position so as to establish a two-way reduced speed drive, said sleeve including additional means, constituting a second centrifugal clutch member, adapted to be automatically engaged with said first centrifugal clutch member after said sleeve is shifted to a second axial position, shift of said sleeve from said first axial position to said second axial position disengaging said two-way reduced speed drive and establishing a one-way reduced speed drive which is capable of being automatically upshifted to a two-way direct drive after said driving shaft has attained a predetermined speed of rotation, said sleeve including additional means adapted to cooperate with said overrunning clutch to neutralize said clutch when said sleeve is located in a neutral position and the two-way reduced speed drive position, said sleeve including additional means adapted to positively disengage said centrifugal clutch members on shift of said sleeve from the direct drive position.

12. In a variable speed power transmission, a driving shaft, a first centrifugal clutch member, including a radially movable pawl, carried by said driving shaft, reduction gears driven by said driving shaft including a reduced speed driving pinion, a driven shaft, a gear journalled on said driven shaft, said gear being in constant mesh with said pinion and having means adapted to be engaged with a shift sleeve, an overrunning clutch positioned between and drivingly connecting said gear and said driven shaft, a shift sleeve mounted on said driven shaft for axial shift relative thereto, said sleeve including means adapted to be engaged with said gear when said sleeve is shifted to one axial position so as to establish a two-way reduced speed drive, said sleeve including a portion formed with a pawl receiving slot constituting a second centrifugal clutch member, said pawl being adapted to be automatically engaged with said pawl slot after said sleeve is shifted to a second axial position, shift of said sleeve from said first axial position to said second axial position disengaging said two-way reduced speed drive and establishing a one-way reduced speed drive which is capable of being automatically upshifted, after said driving shaft attains a predetermined speed of rotation, to a two-way direct drive between said driving and said driven shafts, said sleeve including additional means adapted to cooperate with said overrunning clutch to neutralize said clutch when said sleeve is located in a neutral position and the two-way reduced speed drive positions.

13. In a variable speed power transmission, a driving shaft, a first centrifugal clutch member, including a radially movable pawl, carried by said driving shaft, reduction gears driven by said driving shaft including a reduced speed driving pinion, a driven shaft, a gear journalled on said driven shaft, said gear being in constant mesh with said pinion and having means adapted to be engaged with a shift sleeve, an overrunning clutch positioned between and drivingly connecting said gear and said driven shaft, a shift sleeve mounted on said driven shaft for axial shift relative thereto, said sleeve including means adapted to be engaged with said gear when said sleeve is shifted to one axial position so as to establish a two-way reduced speed drive, said sleeve including a portion formed with a pawl receiving slot constituting a second centrifugal clutch member, said pawl being adapted to be automatically engaged with said pawl slot after said sleeve is shifted to a second axial position, shift of said sleeve from said first axial position to said second axial position disengaging said two-way reduced speed drive and establishing a one-way reduced speed drive which is capable of being automatically upshifted, after said driving shaft attains a predetermined speed of rotation, to a two-way direct drive between said driving and said driven shafts, said sleeve including additional means adapted to engage with said overrunning clutch to neutralize said clutch when said sleeve is located in a neutral position and the two-way reduced speed drive positions, said sleeve including cam means adapted to disengage said pawl from said slot on axial shift of said sleeve from the direct drive position.

14. In a variable speed power transmission, a driving shaft, a first centrifugal clutch member carried by said driving shaft, a reduction gear train driven by said driving shaft including a reduced speed drive pinion, a driven shaft, a gear journalled on said driven shaft, said gear being in constant mesh with said pinion and having means adapted to be engaged with a shift sleeve, an overrunning clutch positioned between and drivingly connecting said gear to said driven shaft, a shift sleeve connected to said driven shaft for axial shift relative thereto, said sleeve including means adapted to be engaged with said gear when said sleeve is shifted to one axial position, means adapted to be engaged with said first centrifugal clutch member when said sleeve is shifted to a different axial position, means adapted to positively disengage said first centrifugal clutch member from said sleeve, and means adapted to engage with said overrunning clutch to selectively neutralize said overrunning clutch.

15. In a variable speed power transmission, a driving shaft, a first centrifugal clutch member including radially movable pawls carried by said driving shaft, a reduction gear train driven by said driving shaft including a reduced speed drive pinion, a driven shaft, a gear journalled on said driven shaft, said gear being in constant mesh with said pinion and having means adapted to be engaged with a shift sleeve, an overrunning clutch positioned between and drivingly connecting said gear to said driven shaft, a shift sleeve connected to said driven shaft for axial shift relative thereto, said sleeve including means adapted to be engaged with said gear when said sleeve is shifted to one axial position, pawl receiving slots adapted to be engaged with the pawls of said first centrifugal clutch member after said sleeve is shifted to a second axial position, cam means adapted to positively disengage said pawls from said slots when said sleeve is moved from said second axial position, and cam means adapted to selectively neutralize said overrunning clutch.

16. In a variable speed power transmission, a drive pinion, a centrifugal clutch member carried by said drive pinion, countershaft gears driven by said drive pinion including an intermediate speed pinion, a driven shaft, an intermediate speed gear journalled on said driven shaft, said intermediate speed gear being in constant mesh with said intermediate speed pinion and having means adapted to be engaged with a shift sleeve, an overrunning clutch adapted to drivingly connect said intermediate speed gear to said driven shaft, and a shift sleeve carried by said driven shaft and shiftable axially thereof, said sleeve having means adapted to be engaged with said intermediate speed gear when said sleeve is shifted to one axial position so as to establish a two-way intermediate speed drive, said sleeve having additional means adapted to be engaged with said centrifugal clutch member, after said sleeve is shifted to a second axial position, shift of said sleeve from said first axial position to said second axial position disengaging said two-way intermediate speed drive and establishing a one-way intermediate speed drive through said overrunning clutch which drive is capable of being automatically upshifted, after said drive pinion attains a predetermined speed of rotation, to a two-way direct drive between said drive pinion and said driven shaft, said sleeve including means adapted to disengage said overrunning clutch when said sleeve is shifted into the neutral position and the first mentioned axial position.

17. A variable speed power transmission as claimed in claim 16, including blocker synchronizer means rotatably mounted between said sleeve and said centrifugal clutch member, and between said sleeve and said intermediate speed gear.

18. A variable speed power transmission as claimed in claim 16, including means adapted to positively disengage said centrifugal clutch member from said sleeve on axial shift of said sleeve from the second mentioned axial position.

19. In a variable speed power transmission, a drive pinion, a centrifugal clutch member, including a radially movable pawl, carried by said drive pinion, countershaft gears driven by said drive pinion including an intermediate speed pinion, a driven shaft, an intermediate speed gear journalled on said driven shaft, said intermediate speed gear being in constant mesh with said intermediate speed pinion and having teeth adapted to be engaged with a shift sleeve, an overrunning clutch adapted to drivingly connect said intermediate speed gear to said driven shaft, and a toothed shift sleeve carried by said driven shaft and shiftable axially thereof, said sleeve having teeth adapted to be engaged with the sleeve engageable teeth of said intermediate speed gear when said sleeve is shifted to one axial position so as to establish a two-way intermediate speed drive, said sleeve providing a portion with a pawl receiving slot adapted to be engaged with the pawl of said centrifugal clutch member, after said sleeve is shifted to a second axial position, shift of said sleeve from said first axial position to said second axial position disengaging said two-way intermediate speed drive and establishing a one-way intermediate speed drive through said overrunning clutch which drive is capable of being automatically upshifted, after said drive pinion attains a predetermined speed of rotation, to a two-way direct drive between said drive pinion and said driven shaft, said sleeve including teeth adapted to cammingly disengage said overrunning clutch when said sleeve is placed in a neutral position or the first mentioned axial position.

20. In a variable speed power transmission, a drive pinion, a centrifugal clutch member, including a radially movable pawl, carried by said drive pinion, countershaft gears driven by said drive pinion including an intermediate speed pinion, a driven shaft, an intermediate speed gear journalled on said driven shaft, said intermediate speed gear being in constant mesh with said intermediate speed pinion and having teeth adapted to be engaged with a shift sleeve, an overrunning clutch adapted to drivingly connect said intermediate speed gear to said driven shaft, and a toothed shift sleeve carried by said driven shaft and shiftable axially thereof, said sleeve having teeth adapted to be engaged with the sleeve engageable teeth of said intermediate speed gear when said sleeve is shifted to one axial position so as to establish a two-way intermediate speed drive, said sleeve providing a portion with a pawl receiving slot adapted to be engaged with the pawl of said centrifugal clutch member, after said sleeve is shifted to a second axial position, shift of said sleeve from said first axial position to said second axial position disengaging said two-way intermediate speed drive and establishing a one-way intermediate speed drive through said overrunning clutch which drive is capable of being automatically upshifted, after said drive pinion attains a predetermined speed of rotation, to a two-way direct drive between said drive pinion and said driven shaft, said sleeve including teeth adapted to cammingly disengage said overrunning clutch when said sleeve is placed in a neutral position or the first mentioned axial position, said slot including a wall portion adapted to cammingly disengage said pawl from said slot when said sleeve is moved from said second mentioned axial position.

21. In a variable speed power transmission, a drive pinion, a centrifugal clutch member, including a radially movable pawl, carried by said drive pinion, countershaft gears driven by said drive pinion including an intermediate speed pinion, a driven shaft, an intermediate speed gear journalled on said driven shaft, said intermediate speed gear being in constant mesh with said intermediate speed pinion and having teeth adapted to be engaged with a shift sleeve, an overrunning clutch adapted to drivingly connect said intermediate speed gear to said driven shaft, and a toothed shift sleeve carried by said driven shaft and shiftable axially thereof, said sleeve having teeth adapted to be engaged with the sleeve engageable teeth of said intermediate speed gear when said sleeve is shifted to one axial position so as to establish a two-way intermediate speed drive, said sleeve providing a portion with a pawl receiving slot adapted to be engaged with the pawl of said centrifugal clutch member, after said sleeve is shifted to a second axial position, shift of said sleeve from said first axial position to said second axial position disengaging said two-way intermediate speed drive and establishing a one-way intermediate speed drive through said overrunning clutch which drive is capable of being automatically upshifted, after said drive pinion attains a predetermined speed of rotation, to a two-way direct drive between said drive pinion and said driven shaft, said sleeve including teeth adapted to cammingly disengage said overrunning clutch when said sleeve is placed in a neutral position or the first mentioned axial position, said slotted portion of said sleeve providing means to cam said pawl radially inwardly on axial shift of said sleeve in both a forwardly and rearwardly direction.

22. In a variable speed power transmission, a drive pinion, a centrifugal clutch member carried by said drive pinion, countershaft gears driven by said drive pinion including a low speed pinion and an intermediate speed pinion, a driven shaft, a low speed gear carried by said driven shaft and shiftable axially thereof, said low speed gear being adapted to be engaged with said low speed pinion for the transmission of a two-way low speed drive, an intermediate speed gear journalled on said driven shaft, said intermediate speed gear being in constant mesh with said intermediate speed pinion and having means adapted to be engaged with a shift sleeve, an overrunning clutch adapted to directly drivingly connect said intermediate speed gear and said driven shaft, said overrunning clutch including a roller cage, and a shift sleeve connected to said driven shaft and shiftable axially thereof, said sleeve having means adapted to be engaged with said intermediate speed gear when said sleeve is shifted to one axial position so as to establish a two-way intermediate speed drive, said sleeve having additional means adapted to be engaged with said centrifugal clutch member, when said sleeve is shifted to a different axial position so as to disengage said two-way intermediate speed drive and establish a one-way intermediate speed drive through said overrunning clutch which drive is capable of being automatically upshifted, under driver control, to a two-way direct drive between said drive pinion and said driven shaft, and automatically downshifted from direct drive to said one-way intermediate speed drive, said sleeve including means adapted to control operation of the cage of said overrunning clutch through axial shift of said sleeve.

23. A variable speed power transmission as claimed in claim 22, including blocker synchronizer means rotatably mounted between said sleeve and said centrifugal clutch member.

24. In a variable speed power transmission, a drive pinion, a centrifugal clutch member, including a radially movable pawl, carried by said drive pinion, countershaft gears driven by said drive pinion including a low speed pinion and an intermediate speed pinion, a driven shaft, a low speed gear carried by said driven shaft and shiftable axially thereof, said low speed gear being adapted to be engaged with said low speed pinion for the transmission of a two-way low speed drive, an intermediate speed gear journalled on said driven shaft, said intermediate speed gear being in constant mesh with said intermediate speed pinion and having means adapted to be engaged with a shift sleeve, an overrunning clutch adapted to directly drivingly connect said intermediate speed gear and said driven shaft, said overrunning clutch including a roller cage, and a shift sleeve connected to said driven shaft and shiftable axially thereof, said sleeve having means adapted to be engaged with said intermediate speed gear when said sleeve is shifted to one axial position, said sleeve including a portion provided with a pawl receiving slot adapted to be engaged with said pawl after said sleeve is shifted to a second axial position, said sleeve including means adapted to control disengagement of said overrunning clutch by axial shift of said sleeve to engage said roller cage.

25. In a variable speed power transmission a driving shaft, a driven shaft, a centrifugal pawl clutch between said shafts adapted to drivingly connect said shafts, said clutch comprising a pawl carrier, a pawl, and an axially shiftable slotted shell, pawl blocker means rotatable relative to said carrier into blocking position relative to said pawl and synchronizing means mounted relative to said blocker means for frictional drive therewith.

26. In a variable speed power transmission a driving shaft, a driven shaft, a centrifugal pawl clutch between said shafts adapted to drivingly connect said shafts, said clutch comprising a pawl carrier, a pawl, and an axially shiftable slotted shell, pawl blocker means rotatable relative to said carrier into blocking position relative to said pawl and shell blocker means having a conical frictional drive connection with said pawl blocker means.

27. In a variable speed power transmission a driving shaft, a driven shaft, a centrifugal pawl clutch between said shafts adapted to drivingly connect said shafts, said clutch comprising a pawl carrier, a pawl and an axially shiftable toothed sleeve having a pawl receiving slot, a pawl blocker member coaxial with said carrier and journalled for rotation relative thereto, and an annular toothed blocker synchronizer mounted relative to said pawl blocker member for frictional drive therewith and interengageable with the teeth of said shift sleeve.

28. In a variable speed power transmission as claimed in claim 27 wherein the pawl has a lateral projection and the pawl blocker has a recess for limiting the relative rotation between said blocker and the pawl carrier.

29. In a variable speed power transmission, a drive pinion, a centrifugal clutch member carried by said drive pinion, countershaft gears driven by said drive pinion including a low speed pinion and an intermediate speed pinion, a driven shaft, a low speed gear carried by said driven shaft and shiftable axially thereof, said low speed gear being adapted to be engaged with said low speed pinion for the transmission of a two-way low speed drive, an intermediate speed gear journalled on said driven shaft, and intermediate speed gear being in constant mesh with said intermediate speed pinion and having means adapted to be engaged with a shift sleeve, an overrunning clutch adapted to drivingly connect said intermediate speed gear and said driven shaft, and a shift sleeve connected to said driven shaft and shiftable axially thereof, said sleeve having means adapted to be engaged with said intermediate speed gear when said sleeve is shifted to one axial position so as to establish a two-way intermediate speed drive, said sleeve having additional means adapted to be engaged with said centrifugal clutch member, when said sleeve is shifted to a different axial position so as to disengage said two-way intermediate speed drive and establish a one-way intermediate speed drive through said overrunning clutch which drive is capable of being automatically upshifted, under driver control, to a two-way direct drive between said drive pinion and said driven shaft, and automatically downshifted from direct drive to said one-way intermediate speed drive, said sleeve including means adapted to control operation of said overrunning clutch through axial shift of said sleeve and said sleeve including means adapted to positively disengage said centrifugal clutch member from said sleeve on axial shift of said sleeve.

WILLIAM T. DUNN.

References Cited in the file of this patent

UNITED STATES PATENTS

| Number | Name | Date |
|---|---|---|
| 2,128,485 | Keller | Aug. 30, 1938 |
| 2,278,623 | Orr | Apr. 7, 1942 |
| 2,343,312 | Maurer | Mar. 7, 1944 |
| 2,403,378 | Kilpela | July 2, 1946 |
| 2,453,794 | Iavelli | Nov. 16, 1948 |
| 2,571,434 | Fishburn | Oct. 16, 1951 |